(12) United States Patent
Akazawa et al.

(10) Patent No.: US 8,687,344 B2
(45) Date of Patent: Apr. 1, 2014

(54) LAMINATED CERAMIC ELECTRONIC COMPONENT

(75) Inventors: Teppei Akazawa, Nagaokakyo (JP); Kenjiro Hadano, Nagaokakyo (JP); Masahiro Sakuratani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 92 days.

(21) Appl. No.: 13/494,042

(22) Filed: Jun. 12, 2012

(65) Prior Publication Data

US 2012/0320495 A1  Dec. 20, 2012

(30) Foreign Application Priority Data

Jun. 15, 2011 (JP) .................................. 2011-132997
Mar. 14, 2012 (JP) .................................. 2012-057087

(51) Int. Cl.
H01G 4/005 (2006.01)
H01G 4/06 (2006.01)
H01G 4/228 (2006.01)

(52) U.S. Cl.
USPC ...................... 361/303; 361/321.2; 361/306.3

(58) Field of Classification Search
USPC ................................... 361/303, 321.2, 306.3
See application file for complete search history.

(56) References Cited

U.S. PATENT DOCUMENTS

| | | | |
|---|---|---|---|
| 6,563,689 B2 * | 5/2003 | Yamamoto ................. | 361/306.1 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2004/0042156 A1 * | 3/2004 | Devoe et al. ............... | 361/321.2 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2009/0310278 A1 * | 12/2009 | Tani .......................... | 361/306.3 |

FOREIGN PATENT DOCUMENTS

| | | |
|---|---|---|
| JP | 2000-299145 A | 10/2000 |
| JP | 2005-340664 A | 12/2005 |

OTHER PUBLICATIONS

Taniguchi et al., "Multilayer Ceramic Electronic Component and Manufacturing Method Thereof", U.S. Appl. No. 12/485,360, filed Jun. 16, 2009.
Yoshida et al., "Monolithic Ceramic Electronic Component", U.S. Appl. No. 12/494,537, filed Jun. 30, 2009.

(Continued)

Primary Examiner — David M Sinclair
(74) Attorney, Agent, or Firm — Keating & Bennett, LLP (57) ABSTRACT

A laminated ceramic electronic component includes curved surface portions provided in an outer surface of a ceramic element assembly, and internal conductors provided within the ceramic element assembly that are exposed in the curved surface portions and principal surfaces to define starting points for plating deposition. A base layer, in an external conductor, which is defined by a plating film is arranged so as to directly cover the exposed portions of the internal conductors.

4 Claims, 8 Drawing Sheets

(56) References Cited

OTHER PUBLICATIONS

Iwanaga et al., "Laminated Ceramic Electronic Component and Manufacturing Method Therefor", U.S. Appl. 13/189,636, filed Jul. 25, 2011.

Sasaki, "Electronic Component", U.S. Appl. No. 13/187,678, filed Jul. 21, 2011.

Akazawa et al., "Multilayer Ceramic Electronic Component", U.S. Appl. No. 13/357,677, filed Jan. 25, 2012.

Taniguchi et al., "Multilayer Ceramic Electronic Component and Manufacturing Method Thereof", U.S. Appl. No. 13/484,300, filed May 31, 2012.

* cited by examiner

LAMINATED CERAMIC ELECTRONIC COMPONENT

BACKGROUND OF THE INVENTION

1. Field of the Invention

The present invention relates to a laminated ceramic electronic component, and in particular, relates to a laminated ceramic electronic component that includes an external conductor including a plating film disposed directly on the outer surface of a ceramic element assembly.

2. Description of the Related Art

Recently, with increases in the speed of ICs mounted in electronic devices, the frequencies of noise leaking from power sources of the ICs onto boards are increased. In addition, with decreases in the operating voltages of ICs, the voltages of power sources are likely to vary.

In view of this, a line-bypass capacitor that has a high noise removal capability and that can suppress a voltage variation of a power source is required, and a chip-type three-terminal capacitor as a suitable capacitor has been disclosed. The chip-type three-terminal capacitor has excellent capability to bypass a high-frequency signal to a ground, and also has an excellent response to a sudden power requirement from a load side, and thus can stabilize a voltage supplied to an IC.

The chip-type three-terminal capacitor has a structure in which a pair of signal terminal electrodes and a ground terminal electrode are provided on the outer surface of a capacitor body. As the ground terminal electrode, a terminal electrode is formed so as to extend on two principal surfaces and two side surfaces of the capacitor body so as to extend around the capacitor body. In this case, an unnecessary inductance component can be reduced. Japanese Unexamined Patent Application Publication No. 2000-299145 discloses a method for forming a terminal electrode that extends on two principal surfaces and two side surfaces of a component body so as to extend around the component body.

As disclosed in Japanese Unexamined Patent Application Publication No. 2000-299145 as well, in the related art, in order to form a terminal electrode that extends around a component body as described above, a conductive paste is applied to the two principal surfaces and the two side surfaces of the component body and is fired. However, in the case of a thick-film-type terminal electrode, the following problems may occur.

Due to the influence of the rheology of the conductive paste, the terminal electrode has a terminal shape in which the center thereof is raised and has an increased thickness. Thus, when being mounted on a board, the raised portion of the terminal electrode may come into contact with the board causing the chip to roll so as to not be mounted properly or accurately.

In addition, it is necessary to apply the conductive paste to four surfaces, and thus the efficiency of formation of the terminal electrode is low.

The above problems can be encountered on one level or another not only when a terminal electrode is formed so as to extend on two principal surfaces and two side surfaces of a component body to extend around the component body, but also when a terminal electrode is formed so as to extend across at least one principal surface. Other than the chip-type three-terminal capacitor, the same problems may occur in other types of electronic components.

SUMMARY OF THE INVENTION

Preferred embodiments of the present invention provide a laminated ceramic electronic component that overcomes the problems described above.

Preferred embodiments of the present invention are directed to a laminated ceramic electronic component that preferably includes a ceramic element assembly including a plurality of laminated ceramic layers.

The ceramic element assembly preferably includes first and second principal surfaces opposed to each other, first and second side surfaces opposed to each other, first and second end surfaces opposed to each other, a first curved surface portion connecting the first principal surface to the first side surface, and a second curved surface portion connecting the first principal surface to the second side surface.

A first external conductor defining a terminal electrode is arranged so as to extend from the first curved surface portion via the first principal surface to the second curved surface portion. The first external conductor is specifically configured to include a plating film disposed directly on the ceramic element assembly to stabilize the attitude of the laminated ceramic electronic component when being mounted. Thus, a thin and flat terminal electrode is provided.

In order to increase the efficiency of plating deposition for forming the plating film, the following configuration is preferably provided.

First to third internal conductors are located within the ceramic element assembly. When the first principal surface is divided along a direction connecting the first side surface to the second side surface into a first region located near the first side surface, a second region located near the second side surface, and a third region sandwiched between the first region and the second region, preferably, the first internal conductor is arranged so as to be exposed in the first curved surface portion and the first region, the second internal conductor is arranged so as to be exposed in the second curved surface portion and the second region, the third internal conductor is arranged so as to be exposed in the first curved surface portion, the second curved surface portion, and the third region, the third internal conductor is exposed in the first curved surface portion so as to be closer to the second principal surface than the first internal conductor, the third internal conductor is exposed in the second curved surface portion so as to be closer to the second principal surface than the second internal conductor, and the third internal conductor is exposed in the third region so as to extend along the first principal surface.

The plating film included in the first external conductor is preferably arranged so as to directly cover exposed portions of the first to third internal conductors.

In the above configuration, the first external conductor defining the terminal electrode extends across at least the first principal surface, and it is not necessary for the first external conductor to extend on the two principal surfaces and the two side surfaces of the ceramic element assembly to extend around the ceramic element assembly.

When it is preferable for the first external conductor to extend on the two principal surfaces and the two side surfaces of the ceramic element assembly to extend around the ceramic element assembly, the following configuration is preferably provided.

The ceramic element assembly preferably includes a third curved surface portion connecting the second principal surface to the first side surface and a fourth curved surface portion connecting the second principal surface to the second side surface.

Fourth to sixth internal conductors are preferably disposed within the ceramic element assembly. When the second principal surface is divided along the direction connecting the first side surface to the second side surface into a fourth region located near the first side surface, a fifth region located near the second side surface, and a sixth region sandwiched between the fourth region and the fifth region, preferably, the fourth internal conductor is arranged so as to be exposed in the third curved surface portion and the fourth region, the fifth internal conductor is arranged so as to be exposed in the fourth curved surface portion and the fifth region, the sixth internal conductor is arranged so as to be exposed in the third curved surface portion, the fourth curved surface portion, and the sixth region, the sixth internal conductor is exposed in the third curved surface portion so as to be closer to the first principal surface than the fourth internal conductor, the sixth internal conductor is exposed in the fourth curved surface portion so as to be closer to the first principal surface than the fifth internal conductor, and the sixth internal conductor is exposed in the sixth region so as to extend along the second principal surface.

The first external conductor is preferably arranged so as to extend around the ceramic element assembly by being extended to the first and second side surfaces and the second principal surface, and the plating film of the first external conductor further directly covers exposed portions of the fourth to sixth internal conductors.

The laminated ceramic electronic component according to a preferred embodiment of the present invention may preferably further include a first internal electrode disposed within the ceramic element assembly so as to be exposed in the first side surface and the second side surface. In this case, the plating film of the first external conductor directly covers exposed portions of the first internal electrode.

In addition to the configuration provided in the preferred embodiments described above, the laminated ceramic electronic component according to a preferred embodiment of the present invention may preferably further include a second internal electrode disposed within the ceramic element assembly so as to be exposed in the first end surface and the second end surface, and a second external conductor provided on the first end surface and the second end surface so as to cover exposed portions of the second internal electrode.

In the laminated ceramic electronic component according to various preferred embodiments of the present invention, the external conductors defining terminal electrodes are preferably configured so as to be thin and flat, and thus, the attitude of the laminated ceramic electronic component when being mounted is stabilized.

In addition, the first to third internal conductors are preferably exposed at least in the first principal surface, and thus, a plating layer can be deposited from the exposed portions of these internal conductors. Therefore, a plating film defining at least a portion of an external conductor can be efficiently provided at least on the first principal surface.

Further, the internal conductors described above extend to at least two locations in the outer surface of the ceramic element assembly and are exposed therein. Thus, in an electrolytic plating treatment, when a medium, such as a steel ball, for example, comes into contact with one location among the exposed portions of the internal conductors, a current flows to the other exposed portions. In other words, the possibility of contact with the medium increases and the current-flow efficiency increases. Thus, a time required for plating to form a plating film defining a base of an external conductor is significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, in describing preferred embodiments of the present invention, laminated ceramic capacitors will be exemplified as laminated ceramic electronic components.

First Preferred Embodiment

FIGS. 1 to 8 illustrate a first preferred embodiment of the present invention. A laminated ceramic capacitor 1 according to the first preferred embodiment preferably is a three-terminal type, for example. The laminated ceramic capacitor 1 preferably includes a ceramic element assembly 2, first and second internal electrodes 3 and 4, first to sixth internal conductors 5 to 10, first and second dummy conductors 11 and 12, and dummy through conductors 13 which are located within the ceramic element assembly 2, and first and second external conductors 14 and 15 which are provided on the outer surface of the ceramic element assembly 2. Hereinafter, the details of the structure of the laminated ceramic capacitor 1 will be described separately, followed by a description of an example of a manufacturing method.

The ceramic element assembly 2 preferably has a substantially rectangular parallelepiped shape, and includes a pair of first and second principal surfaces 17 and 18 opposed to each other, a pair of side surfaces 19 and 20 opposed to each other, and a pair of end surfaces 21 and 22 opposed to each other. Each of the shapes of the end surfaces 21 and 22 may be substantially square. Each corner and each edge of the ceramic element assembly 2 are preferably rounded.

Specifically, a first curved surface portion 23 is arranged so as to connect the first principal surface 17 to the first side surface 19. A second curved surface portion 24 is arranged so as to connect the first principal surface 17 to the second side surface 20. A third curved surface portion 25 is arranged so as to connect the second principal surface 18 to the first side surface 19. A fourth curved surface portion 26 is arranged so as to connect the second principal surface 18 to the second side surface 20.

A curved surface portion is also provided between each of the first and second principal surfaces 17 and 18 and each of the first and second end surfaces 21 and 22, and each corner is preferably also a curved surface.

Here, a direction connecting between the principal surfaces 17 and 18 is defined as a T direction, a direction connecting between the side surfaces 19 and 20 is defined as a W direction, and a direction connecting between the end surfaces 21 and 22 is defined as an L direction.

Figure 3:
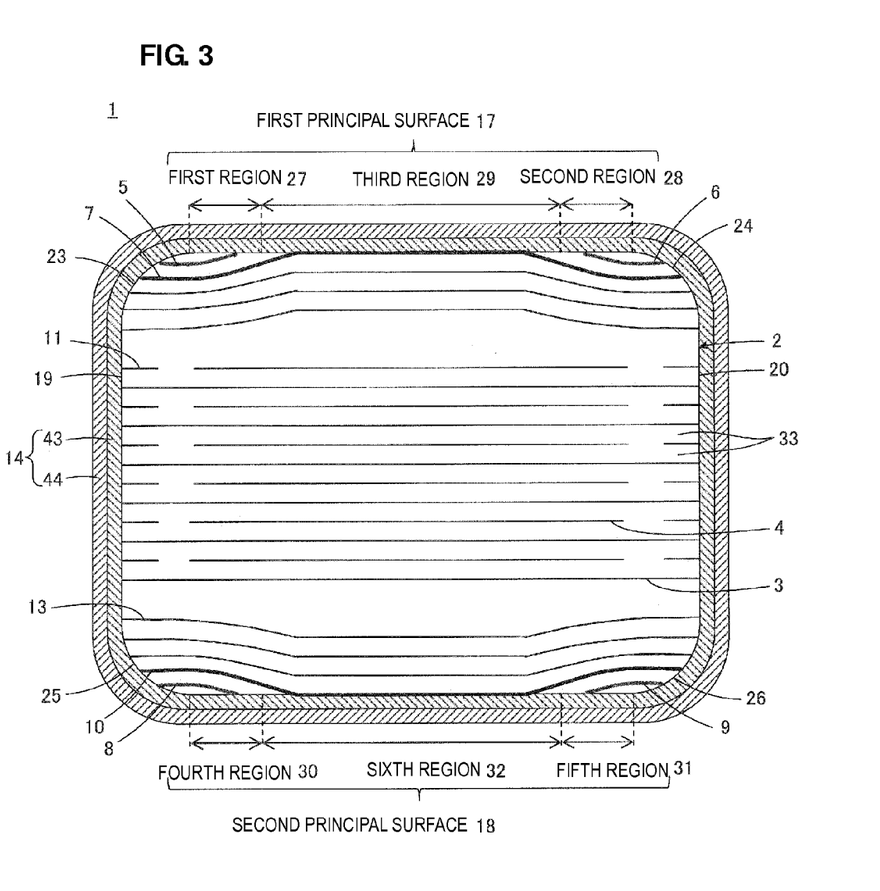
FIG. 3 is a cross-sectional view of the laminated ceramic capacitor shown in FIG. 1 along a plane parallel to end surfaces of the ceramic element assembly.

As shown in FIG. 3, the first principal surface 17 is divided along the W direction into a first region 27, a second region 28, and a third region 29. The first region 27 is located near the first side surface 19, the second region 28 is located near the second side surface 20, and the third region 29 is sandwiched between the first region 27 and the second region 28.

The second principal surface 18 is divided along the W direction into a fourth region 30, a fifth region 31, and a sixth region 32. The fourth region 30 is located near the first side surface 19, the fifth region 31 is located near the second side surface 20, and the sixth region 32 is sandwiched between the fourth region 30 and the fifth region 31.

Figure 1:
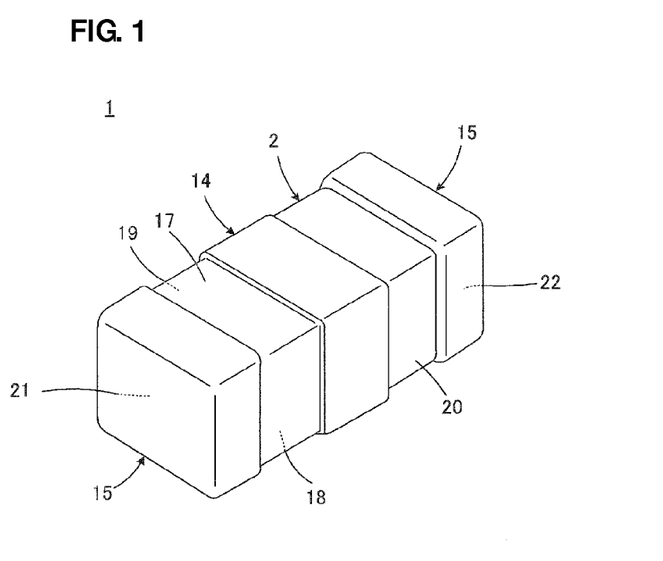
FIG. 1 is a perspective view of a laminated ceramic capacitor as a laminated ceramic electronic component according to a first preferred embodiment of the present invention.
Figure 2:
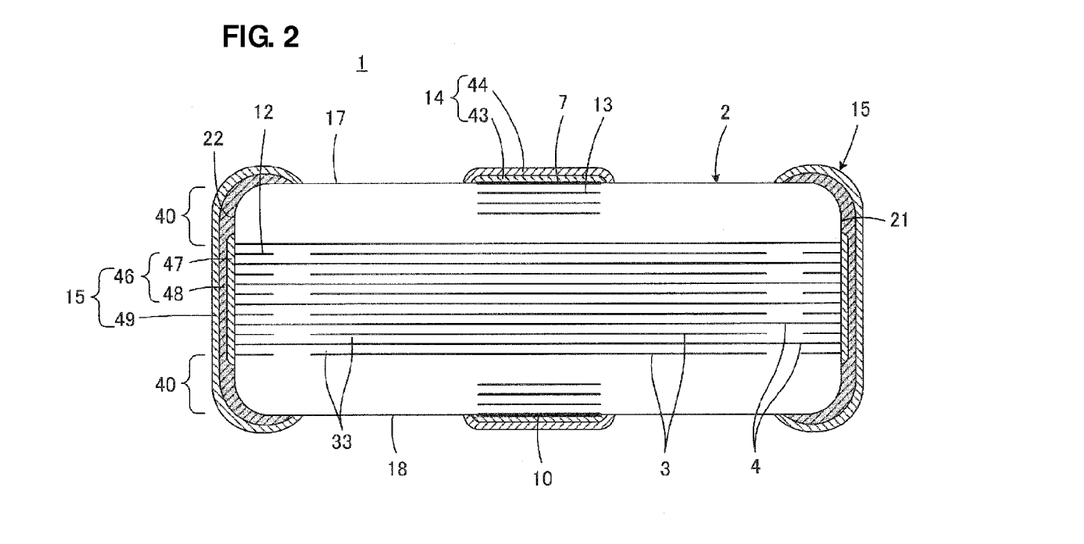
FIG. 2 is a cross-sectional view of the laminated ceramic capacitor shown in FIG. 1 along a plane parallel to side surfaces of a ceramic element assembly.

As shown in FIGS. 2 and 3, the ceramic element assembly 2 preferably has a laminated structure including a plurality of ceramic layers 33 that extend in the W direction and the L direction and that are laminated in the T direction. The thickness of each ceramic layer 33 is preferably about 5 µm to 10 µm, for example. As the ceramic material of each ceramic layer 33, for example, a dielectric ceramic containing $BaTiO_3$, $CaTiO_3$, $SrTiO_3$, or $CaZrO_3$ as a principal component may preferably be used. In addition, a ceramic material obtained by adding an accessory component, such as a Mn compound, a Mg compound, a Si compound, a Co compound, a Ni compound, and a rare earth element compound, for example, to each of these principal compounds may preferably be used.

Figure 4:
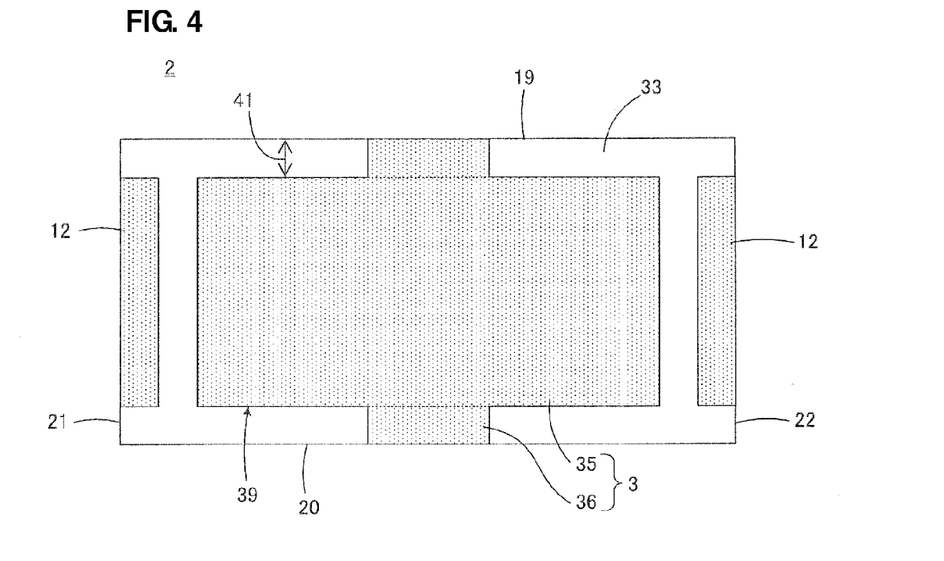
FIG. 4 is a cross-sectional view of the ceramic element assembly shown in FIG. 1 along a plane parallel to principal surfaces of the ceramic element assembly and shows a surface on which a first internal electrode extends.
Figure 5:
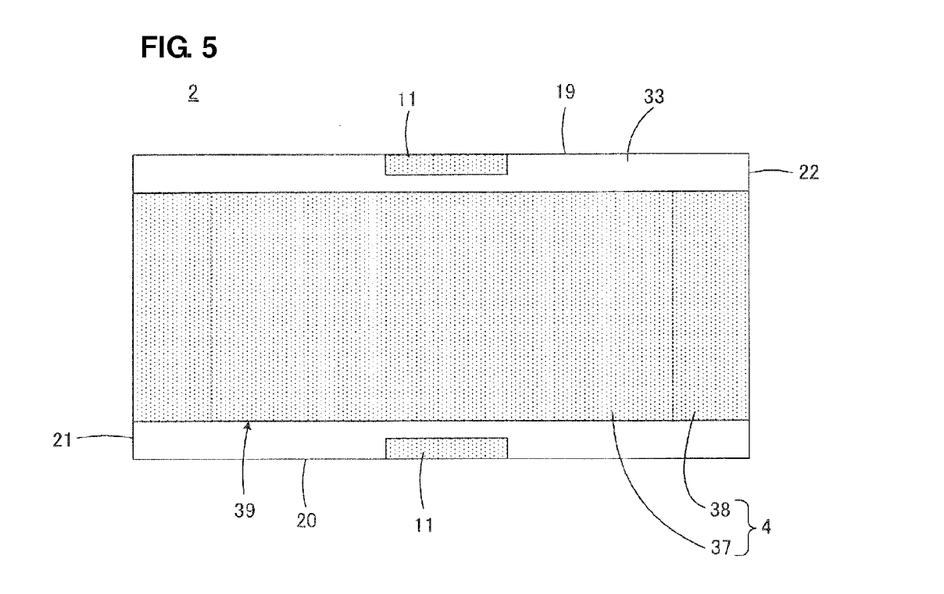
FIG. 5 is a cross-sectional view of the ceramic element assembly shown in FIG. 1 along a plane parallel to the principal surfaces of the ceramic element assembly and shows a surface on which a second internal electrode extends.

Internal electrodes preferably include a plurality of the first internal electrodes 3 shown in FIG. 4 and a plurality of the second internal electrodes 4 shown in FIG. 5. A plurality of the first internal electrodes 3 and a plurality of the second internal electrodes 4 are alternately arranged in a lamination direction of the ceramic element assembly 2, namely, in the T direction.

It should be noted that in FIGS. 4 and 5 and FIGS. 6 and 10 described later, the ceramic element assembly 2 is shown in an unground state, namely, in a state prior to chamfering.

As shown in FIG. 4, each first internal electrode 3 includes a first facing portion 35 that faces the second internal electrodes 4 adjacent to the first internal electrode 3, and first extended portions 36 that extend from the first facing portion 35 to the outer surface of the ceramic element assembly 2. In FIG. 4, the boundary between the first facing portion 35 and each first extended portion 36 in the first internal electrode 3 is shown by a dashed line. In the present preferred embodiment, each first internal electrode 3 preferably has a substantial cross shape, and the number of the first extended portions 36 is preferably two, for example. The two first extended portions 36 are exposed in the first and second side surfaces 19 and 20, respectively. In other words, each first internal electrode 3 is arranged so as to extend from the first side surface 19 to the second side surface 20.

As shown in FIG. 5, each second internal electrode 4 includes a second facing portion 37 that faces the first internal electrodes 3 adjacent to the second internal electrode 4, and at least two second extended portions 38 that extend from the second facing portion 37 to the outer surface of the ceramic element assembly 2. In FIG. 5, the boundary between the second facing portion 37 and each second extended portion 38 in the second internal electrode is shown by a dashed line. In the present preferred embodiment, each second internal electrode 4 preferably has a substantially rectangular shape, and the number of the second extended portions 38 are two, for example. The two second extended portions 38 are exposed in the first and second end surfaces 21 and 22, respectively. In other words, each second internal electrode 4 is arranged so as to extend from the first end surface 21 to the second end surface 22.

As the conductive material defining each of the internal electrodes 3 and 4, for example, Ni, Cu, Ag, Pd, an Ag—Pd alloy, Au, or other suitable material may preferably be used.

In addition, the thickness of each of the internal electrodes 3 and 4 is preferably about 0.3 µm to 2.0 µm, for example.

In a region in which each first facing portion 36 of each first internal electrode 3 and each second facing portion 38 of each second internal electrode 4 face each other across the ceramic layer 33, a capacitance occurs. As shown in FIGS. 4 and 5, in the ceramic element assembly 2, this region is defined as an effective region 39. Meanwhile, as shown in FIG. 2, a region in which no first internal electrode 3 and no second internal electrode 4 are present along the direction in which the ceramic layers 33 are laminated is defined as an outer layer portion 40. In the present preferred embodiment, the outer layer portion 40 is provided on each of the first principal surface 17 side and the second principal surface 18 side of the ceramic element assembly 2. It should be noted that the thickness of each outer layer portion 40 along the T direction is preferably equal to or less than the dimension of a later-described W gap region 41 along the W direction.

As shown in FIG. 3, the first to sixth internal conductors 5 to 10 are preferably disposed in the outer layer portions 40 of the ceramic element assembly 2. In FIGS. 2 and 3, the internal conductors 5 to 10 are shown by thicker lines as compared to those of the internal electrodes 3 and 4 in order to make it easy to distinguish them in the drawings, and this does not represent a thickness relationship therebetween.

Figure 6:
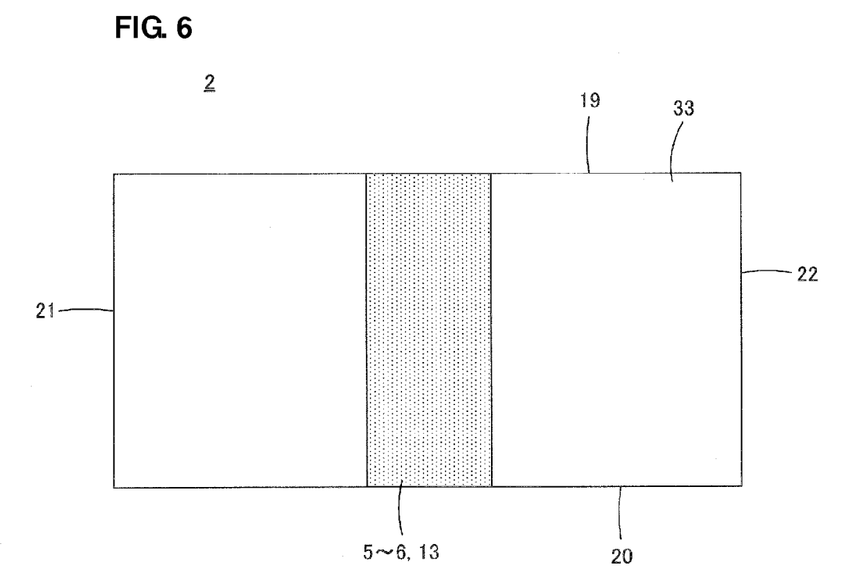
FIG. 6 is a diagram showing a plane pattern of first to sixth internal conductors and dummy through conductors provided within the ceramic element assembly shown in FIG. 1.

The internal conductors 5 to 10 preferably have a planar pattern as shown in FIG. 6. FIG. 6 shows a pattern of the internal conductors 5 to 10 at a stage in which the internal conductors 5 to 10 are printed on ceramic green sheets prior to a later-described press process, namely, at a stage prior to being bent by being pressed.

As shown in FIG. 3, the first internal conductor 5 is exposed in the first curved surface portion 23 and the first region 27. The second internal conductor 6 is laterally symmetrical to the first internal conductor 5 in FIG. 3 and is exposed in the second curved surface portion 24 and the second region 28.

As shown in FIGS. 2 and 3, the third internal conductor 7 is exposed in the first curved surface portion 23, the second curved surface portion 24, and the third region 29. The third internal conductor 7 is exposed in the first curved surface portion 23 so as to be closer to the second principal surface 18 than the first internal conductor 5. In addition, the third internal conductor 7 is exposed in the second curved surface portion 24 so as to be closer to the second principal surface 18 than the second internal conductor 6. The third internal conductor 7 is exposed in the third region 29 so as to extend along the first principal surface 17. It should be noted that "along a principal surface" does not necessarily mean being parallel to the principal surface.

Since the first and second internal conductors 5 and 6 are exposed at two locations and the third internal conductor 7 is exposed at at least three locations as described above, this is advantageous for the case in which a plating film of a base layer 43 of the first external conductor 14 is formed by electrolytic plating. This is because when a medium, such as a steel ball, comes into contact with one exposed portion of each of the internal conductors 5 to 7, a current flows to the other exposed portions, resulting in an increase in the possibility of contact with the medium and an increase in the current-flow efficiency.

The fourth to sixth internal conductors 8 to 10 are preferably vertically symmetrical or substantially symmetrical to the above-described first to third internal conductors 5 to 7 in FIG. 3.

Specifically, as shown in FIG. 3, the fourth internal conductor 8 is exposed in the third curved surface portion 25 and the fourth region 30. The fifth internal conductor 9 is preferably laterally symmetrical or substantially symmetrical to the fourth internal conductor 8 in FIG. 3 and is exposed in the fourth curved surface portion 26 and the fifth region 31.

As shown in FIGS. 2 and 3, the sixth internal conductor 10 is exposed in the third curved surface portion 25, the fourth curved surface portion 26, and the sixth region 32. The sixth internal conductor 10 is exposed in the third curved surface portion 25 so as to be closer to the first principal surface 17 than the fourth internal conductor 8. In addition, the sixth internal conductor 10 is exposed in the fourth curved surface portion 26 so as to be closer to the first principal surface 17 than the fifth internal conductor 9. The sixth internal conductor 10 is exposed in the sixth region 32 so as to extend along the second principal surface 18.

The above-described advantages in electrolytic plating regarding the first to third internal conductors 5 to 7 are also true for the fourth to sixth internal conductors 8 to 10.

The internal conductors 5 to 10 are arranged in a bent state. The bent state is provided in the press process prior to firing, due to steps caused by a difference in electrode density between the effective region 39 in which the first and second internal electrodes 3 and 4 overlap each other and the W gap region 41 (see FIG. 4) in which the extended portions 36 of the first internal electrodes 3 overlap each other.

Each of the internal conductors 5 to 10 may be exposed in a linear or surface state in either of the principal surfaces 17 and 18. In addition, the exposed state can be, for example, a discontinuous state, such as a patchy state.

Figure 7:
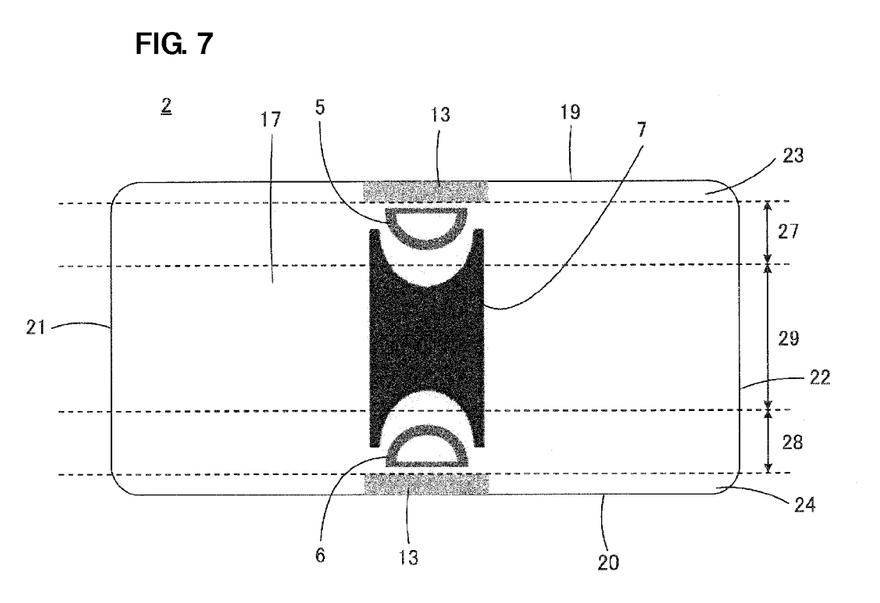
FIG. 7 is a plan view showing an exposed state of the first to third internal conductors in the first principal surface of the ceramic element assembly shown in FIG. 1.

FIG. 7 shows an example of the exposed state of the first to third internal conductors 5 to 7 in the first principal surface 17 of the ceramic element assembly 2. For example, in the cross-sectional view of FIG. 3, for convenience sake, the internal conductors 5 to 10 are shown such that the intervals therebetween are increased. Thus, although it is hard to imagine the exposed state shown in FIG. 7, when a plurality of members are laminated such that intervals therebetween are decreased for each of the internal conductors 5 to 10, exposed portions of the internal conductors located at different heights in the T direction may appear as substantially annular rings depending on a bent state of each internal conductor.

Specifically, as shown in FIG. 7, the exposed portions of the first to second internal conductors 5 and 6 may appear as substantially closed rings. The exposed portion of the third internal conductor 7 may appear as a substantial H shape.

The internal conductors 5 to 10 originally have common rectangular patterns, but provide the exposed portions of shapes as described above, by being bent and ground.

Preferable conditions for the materials and thicknesses of the internal conductors 5 to 10 preferably are the same or substantially the same as those for the above-described internal electrodes 3 and 4. The internal conductors 5 to 10 and the internal electrodes 3 and 4 are preferably made of the same or substantially the same material and have the same or substantially the same thickness.

As shown in FIG. 3, the first dummy conductors 11 are connected to the first external conductor 14. As shown in FIG. 2, the second dummy conductors 12 are connected to the second external conductors 15.

In the present preferred embodiment, as shown in FIG. 5, the first dummy conductors 11 are provided on the surfaces on which the second internal electrodes 4 are provided. As shown in FIG. 4, the second dummy conductors 12 are provided on the surfaces on which the first internal electrodes 3 are provided.

The first and second dummy conductors 11 and 12 define points at which plating films forming base layers of the first and second external conductors 14 and 15 are deposited, and improve the current-flow efficiency. In addition, the first and second dummy conductors 11 and 12 also contribute to improving the strength of the ceramic element assembly 2.

Preferable conditions for the materials and the thicknesses of the dummy conductors 11 and 12 preferably are the same or substantially the same as those for the above-described internal electrodes 3 and 4. The dummy conductors 11 and 12 and the internal electrodes 3 and 4 are preferably made of the same or substantially the same material and have the same or substantially the same thickness.

It should be noted that the dummy conductors 11 and 12 may not be provided.

As shown in FIGS. 2 and 3, the dummy through conductors 13 are provided in the outer layer portions 40. Similarly to the internal conductors 5 to 10, the dummy through conductors 13 preferably have the planar pattern as shown in FIG. 6. Thus, a common printing plate to form the dummy through conductors 13 and to form the internal conductors 5 to 10 may be used.

The dummy through conductors 13 extend to the first side surface 19 and the second side surface 20. In other words, the dummy through conductors 13 are arranged so as to extend from the first side surface 19 to the second side surface 20.

Since the dummy through conductors 13 are exposed at the two locations as described above, it is advantageous in the case in which the plating film of the base layer of the first external conductor 14 is formed by electrolytic plating. This is because a medium, such as a steel ball, comes into contact with one exposed portion of each dummy through conductor 13, and a current flows to the other exposed portion, resulting in an increase in the possibility of contact with the medium and an increase in the current-flow efficiency.

As shown in FIGS. 2 and 3, a plurality of the dummy through conductors 13 are preferably laminated continuously along the T direction of the ceramic element assembly 2. The dummy through conductors 13 may be bent due to influence of steps as shown in FIG. 3, similarly to the internal conductors 5 to 10. The dummy through conductors do not substantially contribute to the electrical characteristics, such as a capacitance.

Preferable conditions for the materials and the thicknesses of the dummy through conductors 13 are the same or substantially the same as those for the above-described internal electrodes 3 and 4. The dummy through conductors 13 and the internal electrodes 3 and 4 are preferably made of the same or substantially the same material and have the same or substantially the same thickness.

The number of the dummy through conductors 13 is preferably about 10 to 100, for example, in each outer layer portion 40. It should be noted that the dummy through conductors 13 may not be provided.

As clearly shown in FIG. 3, the first external conductor 14 is arranged so as to extend around the first and second principal surfaces 17 and 18 and the first and second side surfaces 19 and 20 of the ceramic element assembly 2.

The first external conductor 14 covers the exposed portions of the first internal electrode 5, the first to sixth internal conductors 5 to 10, the first dummy conductors 11, and the dummy through conductor 13. The base layer 43 of the first external conductor 14 is in contact with the exposed portions. The base layer 43 is preferably a plating film.

Figure 8:
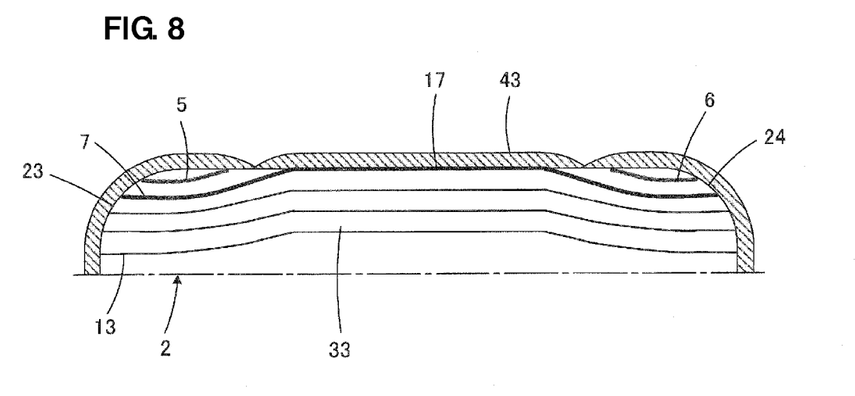
FIG. 8 is a cross-sectional view of the ceramic element assembly shown in FIG. 1 along a plane parallel to the end surfaces of the ceramic element assembly and shows a state that can occur when a base layer of a first external conductor is formed on the ceramic element assembly.

It should be noted that as shown on the first principal surface 17 side in FIG. 8, the base layer 43 defined by a plating film may be partially thin on each of the principal surfaces 17 and 18 and near the boundary between the first and third regions 27 and 29, near the boundary between the second and third regions 28 an 29, near the boundary between the fourth and sixth regions 30 and 32, and near the boundary between the fifth and sixth regions 31 and 32 (see FIG. 3).

As the metal used for the plating film defining the base layer 43, for example, Cu, Ni, Ag, Pd, an Ag—Pd alloy, Au, Sn, Pb, Pd, Bi, Zn, or other suitable metal may preferably be used. The plating film preferably does not include a glass component. In addition, the metal proportion in the plating film per unit area is preferably equal to or greater than about 99% by volume, for example.

The thickness of the thickest portion of the plating film defining the base layer 43 is preferably about 1 μm to 20 μm, for example.

The first external conductor 14 may preferably further include an upper layer 44 provided on the base layer 43. The upper layer 44 is preferably, for example, a plating film. As the metal used for the plating film defining the upper layer 44, for example, Cu, Ni, Ag, Pd, an Ag—Pd alloy, Au, Sn, Pb, Pd, Bi, Zn, or other suitable metal may preferably be used. The plating film of the upper layer may preferably include a plurality of layers. The thickness of the plating film of the upper layer 44 is preferably about 1 μm to about 10 μm per layer, for example.

When the upper layer 44 is provided in the first external conductor 14, preferably, the above-described base layer 43 is a Ni plating film and the upper layer 44 is a Sn plating film, for example. Alternatively, when the upper layer 44 includes a plurality of layers, the upper layer 44 preferably has a two-layer structure including a Ni plating layer and a Sn plating layer located on the Ni plating layer, for example.

The second external conductors 15 are connected to a different potential from the first external conductor 14, and are located on the first and second end surfaces 21 and 22, respectively, of the ceramic element assembly 2 as shown in FIG. 2. In the present preferred embodiment, the second external conductors 15 extend around to the first and second principal surfaces 17 and 18 and the first and second side surfaces 19 and 20.

The second external conductors 15 cover the exposed portions of the second extended portions 38 and the exposed portions of the second dummy conductors 12 so as to be electrically connected to the second internal electrodes 4. In each second external conductor 15, a base layer 46 that is in contact with the exposed portions of the second internal electrodes 4 may preferably be a plating film, a sintered metal film, and/or a conductive resin film, for example.

When a plating film is selected as the member defining the base layer 46, for example, Cu, Ni, Ag, Pd, an Ag—Pd alloy, Au, Sn, Pb, Pd, Bi, Zn, or other suitable metal may preferably be used. In this case, the thickness of the thickest portion of the base layer 46 is preferably about 1 μm to 20 μm, for example. The second dummy conductors 12 function to prompt deposition and growth of the plating film that defines the base layer 46.

When a plating film is selected as the member defining the base layer 46, the thickness of the base layer 46 is preferably the same or substantially the same as the thickness of the plating film that defines the base layer 43 of the first external conductor 14.

When a sintered metal film is selected as the member defining the base layer 46, for example, Cu, Ni, Ag, Pd, an Ag—Pd alloy, Au, or other suitable metal may preferably be used as the metal defining the sintered metal film. The sintered metal film may contain a glass component. In addition, the sintered metal film may be sintered simultaneously with the ceramic element assembly 2 and the internal electrodes 3 and 4 or may be obtained by applying a conductive paste to the sintered ceramic element assembly 2 and firing the applied conductive paste.

When a conductive resin film is selected as the member defining the base layer 46, the conductive resin film may preferably be formed using a mixture of a thermosetting resin and a metal filler, for example.

When the above-described sintered metal film or conductive resin film is selected, the thickness of the thickest portion of the base layer 46 is preferably about 10 μm to about 50 μm, for example.

In the present preferred embodiment, the base layer 46 includes a plating film 47 that is in contact with each of the exposed portions of the second internal electrodes 4 and the second dummy conductors 12; and a sintered metal film 48 that is formed on the plating film 47.

Here, the purpose of forming the outside of the base layer 46 from the sintered metal includes improving the manufacturing efficiency. With only the plating film 47, it may take time to cause the second external conductors 15 to grow to the first and second principal surfaces 17 and 18 and the first and second side surfaces 19 and 20. However, when the sintered metal film 48 is used, the second external conductors 15 can be caused to extend around in a short time by paste application. Secondly, the purpose includes improving the sealing of the second external conductors 15. It is assumed that the plating film 47 is relatively thin. Thus, with only the plating film 47, water of a plating solution used when a plating film of an upper layer 49 is formed may enter the ceramic element assembly 2. When the sintered metal film 48 is used, the sealing is improved by the glass component.

Each second external conductor 15 may preferably further include the upper layer 49 provided on the base layer 46. The upper layer 49 is preferably, for example, a plating film. As the metal of the plating film defining the upper layer 49, for example, Cu, Ni, Ag, Pd, an Ag—Pd alloy, Au, Sn, Pb, Pd, Bi, Zn, or other suitable metal may preferably be used. The plating film of the upper layer 49 may preferably include a plurality of layers. In this case, the plating film preferably has a two-layer structure including a Ni plating layer and a Sn plating layer disposed on the Ni plating layer, for example. The thickness of the plating film of the upper layer 49 is preferably about 1 μm to about 10 μm per layer, for example.

The overall thickness of each second external conductor 15 is likely to be greater than the overall thickness of the first external conductor 14 but both are preferably the same or substantially the same.

The laminated ceramic capacitor 1 is manufactured, for example, as follows.

Ceramic green sheets for forming the ceramic layers 33, an internal electrode conductive paste, and an external conductor conductive paste are prepared. The internal electrode conductive paste is also used as an internal conductor conductive paste, a dummy conductor conductive paste, and a dummy through conductor conductive paste. Each of the ceramic green sheets, the internal electrode conductive paste, and the external conductor conductive paste includes a binder and a solvent, and a known organic binder and organic solvent may be used.

The conductive paste is printed on the ceramic green sheets in predetermined patterns by, for example, screen printing or other suitable method to form an internal electrode pattern, an internal conductor pattern, a dummy conductor pattern, and a dummy through conductor pattern.

A predetermined number of external layer ceramic green sheets on which no patterns are printed and a predetermined number of ceramic green sheets on which various patterns have been printed are laminated in a predetermined order to produce a mother laminate.

The mother laminate is pressed in the lamination direction by a rubber press or other suitable press. During pressing, the internal conductors 5 to 10 and the dummy through conductors 13 are bent as shown in FIG. 3 under the influence of the step between the effective region 39 and the W gap region 41. At that time, the internal electrodes 3 and 4 and the extended portions 36 and 38 may be bent.

The mother laminate is cut into a predetermined size to cut out a raw ceramic element assembly.

The raw ceramic element assembly is fired, and the ceramic element assembly 2 is obtained. The firing temperature is preferably about 900° C. to about 1300° C., for example, although it depends on the materials of the ceramic, the internal electrodes, and other factors.

The ceramic element assembly 2 that has been fired is ground, such that the corners and the edges of the ceramic element assembly 2 are rounded. As a result, in the ceramic element assembly 2, the curved surface portions 23 to 26 are formed, and while a portion of each of the internal conductors 5 to 10 is removed, these internal conductors 5 to 10 are exposed in the curved surface portions 23 to 26 and the corresponding principal surfaces 17 and 18. Barrel polishing or other suitable method may be used for grinding.

Plating treatment is performed on the ceramic element assembly 2 that has been ground.

The base layer 43 of the first external conductor 14 is formed as a plating film. At that time, as shown in FIG. 3, not only the first internal electrodes 3 but also the first to sixth internal conductors 5 to 10, the first dummy conductors 11, and the dummy through conductors 13 are exposed in the side surfaces 19 and 20, the corresponding curved surface portions 23 and 26, and the corresponding principal surfaces 17 and 18, and the plating deposits out from these exposed portions. Thus, the base layer 43 of the first external conductor 14 is efficiently formed.

For the plating treatment, electrolytic plating by a rotating barrel method is preferably used. The plating method is preferably rotation barrel plating, for example. For the plating treatment, a conductive medium, such as a steel ball is preferably used.

Each of the first, second, fourth, and fifth internal conductors 5, 6, 8, and 9 and the dummy through conductors 13 includes two exposed portions, and each of the third and sixth internal conductors 7 and 10 includes at least three exposed portions. Thus, in the plating process, when the conductive medium comes into contact with one exposed portion, a current flows to the other exposed portions. In other words, the possibility of contact with the medium increases and the current-flow efficiency increases. Thus, the plating time to form the base layer 43 is shortened.

In the plating treatment, at the same time, the plating deposits grow from each of the exposed portions of the second internal electrode 4 and the second dummy conductors 12, whereby the plating film 47 in the base layer 46 of each second external conductor 15 is also formed.

After the plating treatment, heat treatment is preferably conducted at a temperature of about 600° C. to about 900° C., for example. By so doing, the fixing strength of the plating film with respect to the ceramic element assembly 2 is improved.

The sintered metal film 48 in the base layer 46 of each second external conductor 15 is formed by applying and baking the conductive paste. The baking temperature is preferably about 700° C. to about 900° C., for example.

Plating treatment is performed in order to form the upper layer 44 of the first external conductor 14 and the upper layer 49 of each second external conductor 15.

In this manner, the laminated ceramic capacitor 1 is completed.

Second Preferred Embodiment

Figure 9:
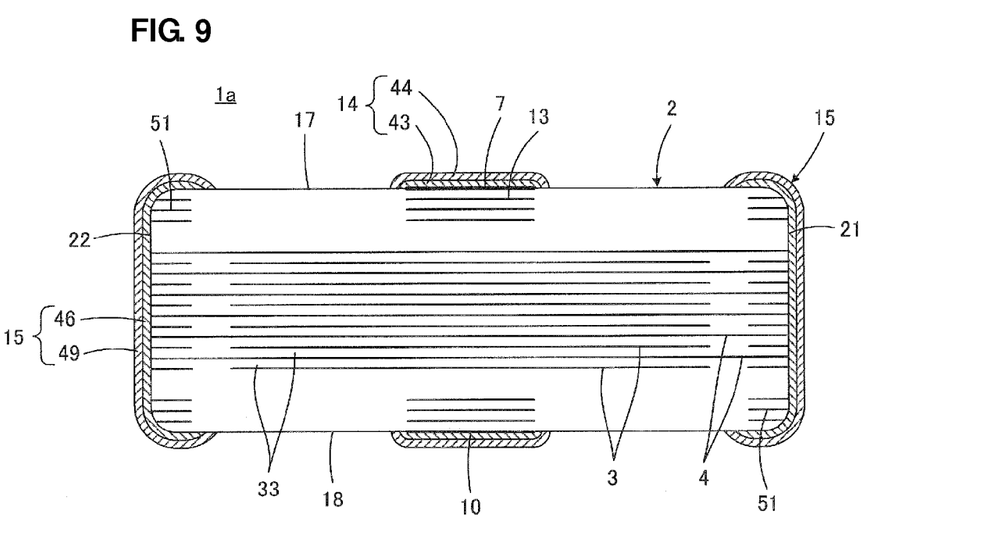
FIG. 9 is a cross-sectional view of a laminated ceramic capacitor as a laminated ceramic electronic component according to a second preferred embodiment of the present invention along a plane parallel to side surfaces of a ceramic element assembly.
Figure 10:
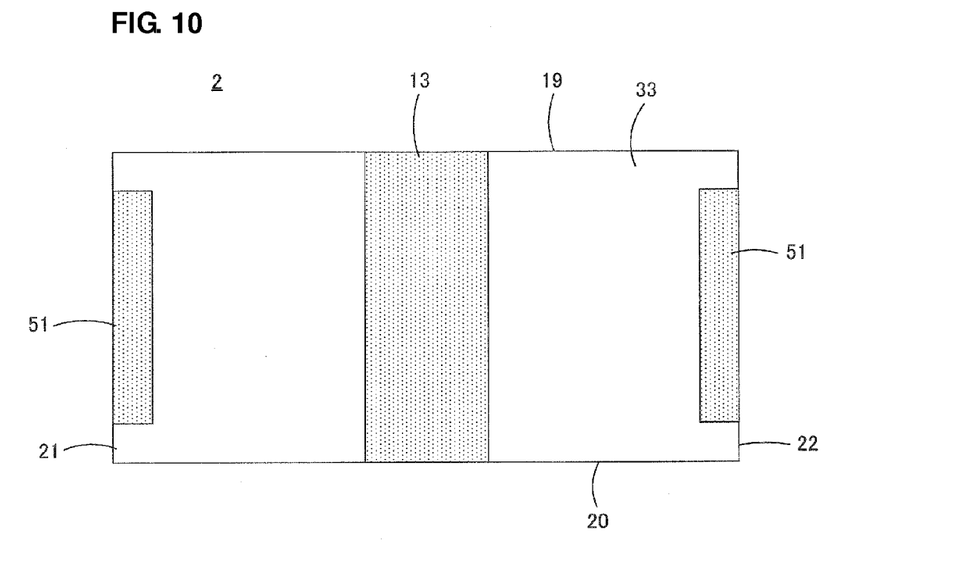
FIG. 10 is a cross-sectional view of the ceramic element assembly shown in FIG. 9 along a plane parallel to principal surfaces of the ceramic element assembly and shows a surface on which a dummy through conductor and third dummy conductors extend.

A second preferred embodiment of the present invention is shown in FIGS. 9 and 10. FIG. 9 corresponds to FIG. 2, and FIG. 10 corresponds to FIG. 6. In FIGS. 9 and 10, elements corresponding to elements shown in FIG. 2 or FIG. 6 are designated by the same reference signs, and the description thereof is omitted.

A laminated ceramic capacitor 1a according to the second preferred embodiment preferably includes third dummy conductors 51 that are located on the surfaces on which the dummy through conductors 13 are located.

In addition, the entirety of the base layer 46 of each second external conductor 15 is preferably a plating film. Due to this, the base layers 43 and 46 of the first and second external conductors 14 and 15 can be simultaneously formed. Further, the overall thickness of the first external conductor 14 and the overall thickness of each second external conductor 15 are the same or substantially the same.

Each third dummy conductor 51 defines a point at which the plating film defining the base layer 46 of each second external conductor 15 is deposited and grown, and improves the current-flow efficiency.

Third Preferred Embodiment

Figure 11:
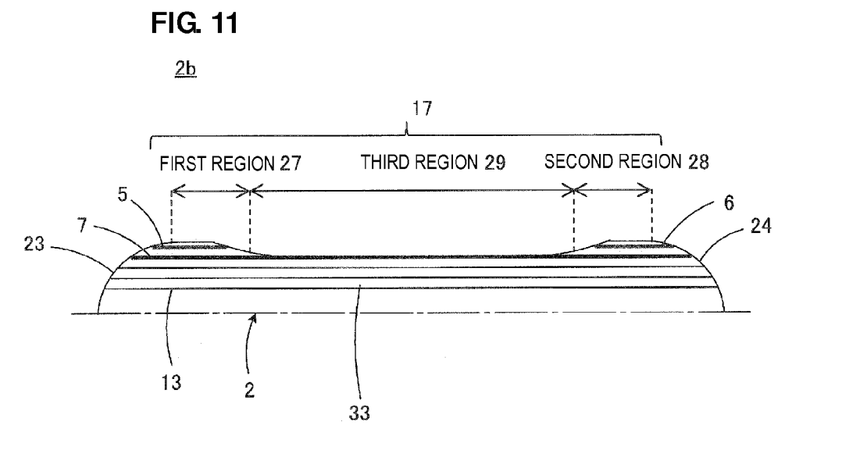
FIG. 11 is a cross-sectional view of a ceramic element assembly provided in a laminated ceramic capacitor as a laminated ceramic electronic component according to a third preferred embodiment of the present invention along a plane parallel to end surfaces of the ceramic element assembly.

A third preferred embodiment of the present invention is shown in FIG. 11. FIG. 11 shows a portion corresponding to a portion of the ceramic element assembly 2 shown in FIG. 3. In FIG. 11, elements corresponding to elements shown in FIG. 3 are designated by the same reference signs, and the description thereof is omitted.

In a ceramic element assembly 2b according to the third preferred embodiment, a central portion of the first principal surface 17 is preferably recessed. Although not shown, the second principal surface 18 can similarly include a central portion that is recessed.

As described above, the internal conductors 5 to 7 may preferably be exposed in the first to third regions 27 to 29 even when they are not necessarily bent as shown in FIG. 3. Although not shown, the internal conductors 8 to 10 can be exposed in the fourth to sixth regions 30 and 32 even when they are not necessarily bent as shown in FIG. 3.

The state of the ceramic element assembly 2b as shown in FIG. 11 can be achieved by, for example, lengthening the grinding time to remove more of each of the central portions of the principal surfaces 17 and 18 when grinding is performed after baking.

Fourth Preferred Embodiment

Figure 12:
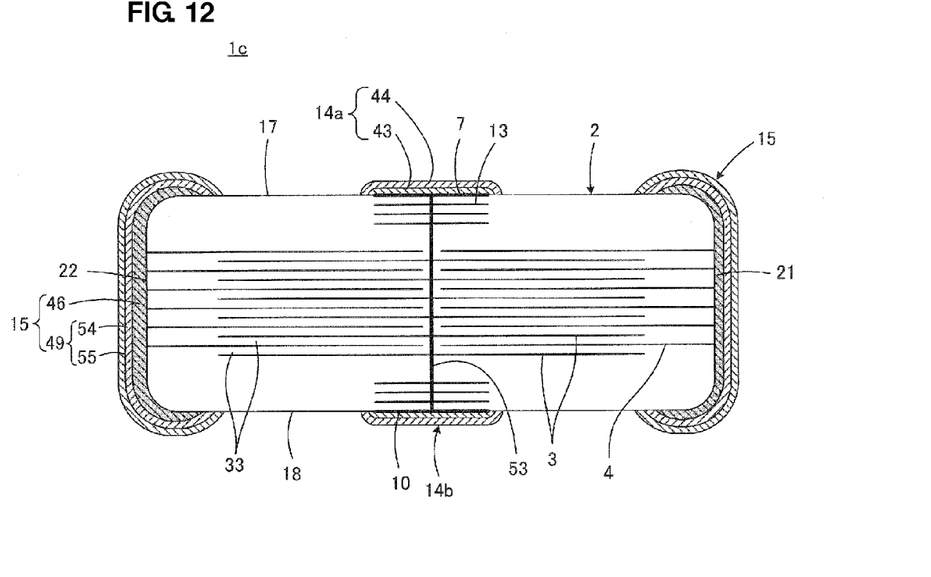
FIG. 12 is a cross-sectional view of a laminated ceramic capacitor as a laminated ceramic electronic component according to a fourth preferred embodiment of the present invention along a plane parallel to side surfaces of a ceramic element assembly.
Figure 13:
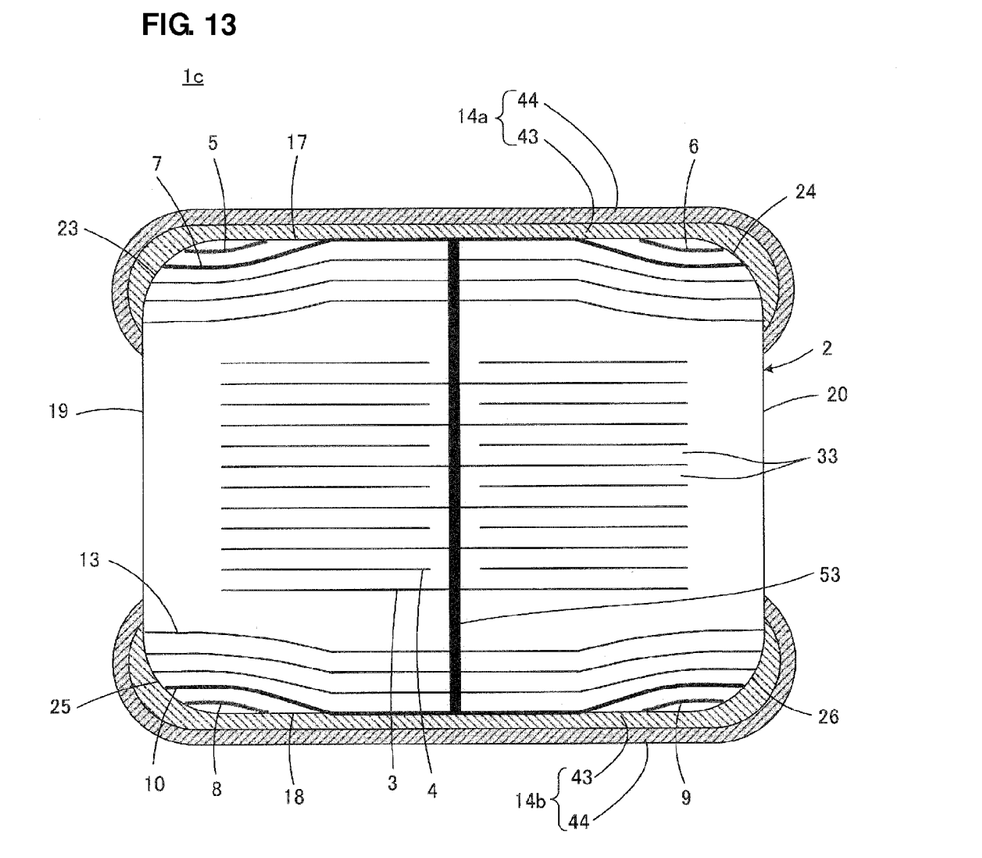
FIG. 13 is a cross-sectional view of the laminated ceramic capacitor shown in FIG. 12 along a plane parallel to end surfaces of the ceramic element assembly.

A fourth preferred embodiment of the present invention is shown in FIGS. 12 and 13. FIG. 12 corresponds to FIG. 2 and FIG. 13 corresponds to FIG. 3. In FIGS. 12 and 13, elements corresponding to elements shown in FIG. 2 or FIG. 3 are designated by the same reference signs, and the description thereof is omitted.

A laminated ceramic capacitor 1c according to the fourth preferred embodiment preferably includes a first external conductor arranged so as to be divided into an upper external conductor 14a and a lower external conductor 14b. Thus, the first internal electrodes 3 do not extend to the side surfaces 19 and 20, and dummy conductors corresponding to the first dummy conductors 11 are not provided.

Further, the laminated ceramic capacitor 1c according to the fourth preferred embodiment preferably includes a signal via conductor 53 that is disposed within the ceramic element assembly 2. The signal via conductor 53 is electrically connected to the first internal electrodes 3 but is electrically insulated from the second internal electrodes 4. In addition, the signal via conductor 53 is electrically connected to the third and sixth internal conductors 7 and 10 and the dummy through conductors 13. Both ends of the signal via conductor 53 are electrically connected to the upper external conductor 14a and the lower external conductor 14b, respectively, as the first external conductor.

A signal current flows through the signal via conductor 53, and a parasitic high-frequency noise in the signal current is removed from the signal via conductor 53 through the first internal electrodes 3, the second internal electrodes 4, and the ground second external conductors 15 to a ground.

As the conductive material used for the signal via conductor 53, for example, Ni, Cu, Ag, Pd, an Ag—Pd alloy, Au, or other suitable conductive material may preferably be used.

According to the present preferred embodiment, the first to sixth internal conductors 5 to 10 are preferably disposed in the ceramic element assembly 2. Thus, as compared to the case in which only the signal via conductor 53 is connected to the upper external conductor 14a and the lower external conductor 14b as the first external conductor, the fixing strength of the external conductors 14a and 14b is improved, and a current path can be distributed to decrease the inductance.

In the laminated ceramic capacitor 1c according to the fourth preferred embodiment, as shown in FIG. 12, each second external conductor 15 preferably includes a base layer 46 defined by a sintered metal film and an upper layer 49 defined by a plating film, and the upper layer 49 has a two-layer structure including, for example, a first plating layer 54 made from Ni and a second plating layer 55 made from Sn. In the laminated ceramic capacitor 1c, since the base layer 46 is defined by the sintered metal film, dummy conductors corresponding to the second dummy conductors 12 are not provided.

Preferred embodiments of the present invention are not limited to the laminated ceramic capacitors described above and are also applicable to other laminated ceramic electronic components. For example, when the ceramic element assembly is made of a piezoelectric ceramic, a piezoelectric component can be obtained. When the ceramic element assembly is made of a semiconductor ceramic, such as a spinel ceramic, a thermistor can be obtained. In addition, it is also possible to use preferred embodiments of the present invention for a stripline in which a dielectric board having a low dielectric constant is used as a base.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A laminated ceramic electronic component comprising:
a ceramic element assembly including a plurality of laminated ceramic layers, first and second principal surfaces opposed to each other, first and second side surfaces opposed to each other, first and second end surfaces opposed to each other, a first curved surface portion connecting the first principal surface to the first side surface, and a second curved surface portion connecting the first principal surface to the second side surface;
first to third internal conductors provided within the ceramic element assembly; and
a first external conductor extending from the first curved surface portion via the first principal surface to the second curved surface portion; wherein
the first principal surface is divided along a direction connecting the first side surface to the second side surface into a first region located near the first side surface, a second region located near the second side surface, and a third region sandwiched between the first region and the second region;
the first internal conductor is exposed in the first curved surface portion and the first region;
the second internal conductor is exposed in the second curved surface portion and the second region;
the third internal conductor is exposed in the first curved surface portion, the second curved surface portion, and the third region;
the third internal conductor is exposed in the first curved surface portion so as to be closer to the second principal surface than the first internal conductor;

the third internal conductor is exposed in the second curved surface portion so as to be closer to the second principal surface than the second internal conductor;

the third internal conductor is exposed in the third region so as to extend along the first principal surface; and the first external conductor includes a plating film that directly covers exposed portions of the first to third internal conductors.

2. The laminated ceramic electronic component according to claim 1, wherein the ceramic element assembly includes a third curved surface portion connecting the second principal surface to the first side surface and a fourth curved surface portion connecting the second principal surface to the second side surface;

the laminated ceramic electronic component further includes fourth to sixth internal conductors provided within the ceramic element assembly;

the second principal surface is divided along the direction connecting the first side surface to the second side surface into a fourth region located near the first side surface, a fifth region located near the second side surface, and a sixth region sandwiched between the fourth region and the fifth region;

the fourth internal conductor is exposed in the third curved surface portion and the fourth region;

the fifth internal conductor is exposed in the fourth curved surface portion and the fifth region;

the sixth internal conductor is exposed in the third curved surface portion, the fourth curved surface portion, and the sixth region;

the sixth internal conductor is exposed in the third curved surface portion so as to be closer to the first principal surface than the fourth internal conductor;

the sixth internal conductor is exposed in the fourth curved surface portion so as to be closer to the first principal surface than the fifth internal conductor;

the sixth internal conductor is exposed in the sixth region so as to extend along the second principal surface;

the first external conductor extends around the ceramic element assembly by extending to the first and second side surfaces and the second principal surface; and the plating film of the first external conductor directly covers exposed portions of the fourth to sixth internal conductors.

3. The laminated ceramic electronic component according to claim 1, further comprising:

a first internal electrode provided within the ceramic element assembly so as to be exposed in the first side surface and the second side surface; wherein the plating film of the first external conductor directly covers exposed portions of the first internal electrode.

4. The laminated ceramic electronic component according to claim 3, further comprising:

a second internal electrode provided within the ceramic element assembly so as to be exposed in the first end surface and the second end surface; and a second external conductor provided on the first end surface and the second end surface so as to cover exposed portions of the second internal electrode.

* * * * *